(12) United States Patent
Hakobyan et al.

(10) Patent No.: US 11,709,259 B2
(45) Date of Patent: Jul. 25, 2023

(54) METHOD FOR OPERATING A SENSOR OF A MOTOR VEHICLE

(71) Applicant: Robert Bosch GmbH, Stuttgart (DE)

(72) Inventors: Gor Hakobyan, Stuttgart (DE); Johannes Fink, Karlsruhe (DE); Karim Guirguis, Stuttgart (DE); Thomas Brosche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 17/118,055

(22) Filed: Dec. 10, 2020

(65) Prior Publication Data

US 2021/0190943 A1 Jun. 24, 2021

(30) Foreign Application Priority Data

Dec. 19, 2019 (DE) .......................... 102019220223.3

(51) Int. Cl.
*G01S 13/931* (2020.01)
*G01S 13/06* (2006.01)
*G01S 13/90* (2006.01)

(52) U.S. Cl.
CPC ............ *G01S 13/931* (2013.01); *G01S 13/06* (2013.01); *G01S 13/9029* (2013.01)

(58) Field of Classification Search
CPC ..... G01S 13/931; G01S 13/06; G01S 13/9029
USPC ....................................................... 342/25 R
See application file for complete search history.

(56) References Cited

U.S. PATENT DOCUMENTS

| | | | | |
|---|---|---|---|---|
| 5,122,803 A * | 6/1992 | Stann | .................. | G01S 13/9029 342/25 B |
| 6,426,718 B1* | 7/2002 | Ridgway | ............. | G01S 13/9029 342/159 |
| 6,441,772 B1* | 8/2002 | Hellsten | .............. | G01S 13/9017 342/25 R |
| 7,295,942 B2* | 11/2007 | Joublin | ................. | G05B 19/401 382/314 |
| 8,306,747 B1* | 11/2012 | Gagarin | ................... | G01C 7/04 701/514 |
| 9,176,226 B1* | 11/2015 | Sego | .................... | G01S 13/9029 |
| 9,463,798 B2* | 10/2016 | Renner | ................ | G05D 1/0246 |
| 10,207,712 B2* | 2/2019 | Schaper | ............... | B60W 50/14 |
| 10,625,776 B2* | 4/2020 | Rebhan | ................ | B60W 30/16 |
| 2004/0068359 A1* | 4/2004 | Neiss | .................... | G05B 13/048 180/170 |
| 2014/0361921 A1* | 12/2014 | Aprile | ................. | G01S 13/9029 342/25 B |

(Continued)

FOREIGN PATENT DOCUMENTS

DE 102017128194 A1 5/2018
DE 102017129933 A1 6/2019

(Continued)

*Primary Examiner* — Nuzhat Pervin
(74) *Attorney, Agent, or Firm* — Norton Rose Fulbright US LLP; Gerard Messina

(57) ABSTRACT

A method for operating a sensor of a motor vehicle. The method includes: ascertaining an ego trajectory of the sensor, generating adaptation signals for adapting at least one operating parameter of the sensor based on the ascertained ego trajectory and outputting the adaptation signals in order to adapt the at least one operating parameter of the sensor based on the adaptation signals. A device, a sensor system, a motor vehicle, a computer program, and a machine-readable memory medium, are also described.

13 Claims, 3 Drawing Sheets

(56) References Cited

U.S. PATENT DOCUMENTS

| | | | | |
|---|---|---|---|---|
| 2015/0088338 A1* | 3/2015 | Renner | ............... | B60T 8/172 |
| | | | | 701/1 |
| 2015/0178620 A1* | 6/2015 | Ascari | ............... | G06N 20/00 |
| | | | | 706/21 |
| 2016/0019458 A1* | 1/2016 | Kaufhold | ............ | G01S 13/9027 |
| | | | | 706/20 |
| 2016/0236683 A1* | 8/2016 | Eggert | ............... | G08G 1/166 |
| 2017/0355336 A1* | 12/2017 | Freienstein | ......... | B60R 21/0132 |
| 2018/0009444 A1* | 1/2018 | Grimm | ............... | B60W 50/04 |
| 2018/0257647 A1* | 9/2018 | Jurca | ............... | G01S 13/931 |
| 2019/0086513 A1* | 3/2019 | Lipson | ............... | G01S 7/4865 |
| 2019/0118834 A1* | 4/2019 | Wiebel-Herboth | ..... | G06F 3/013 |
| 2020/0088525 A1* | 3/2020 | Amini | ............... | G01C 21/30 |
| 2021/0125431 A1* | 4/2021 | Mcgill | ............... | G01S 13/931 |
| 2021/0293546 A1* | 9/2021 | Zhang | ............... | G06T 17/05 |
| 2022/0019893 A1* | 1/2022 | Kwon | ............... | G06V 10/763 |

FOREIGN PATENT DOCUMENTS

| | | | | |
|---|---|---|---|---|
| EP | 1149331 B1 * | 7/2005 | ............ | G05B 13/026 |
| EP | 3365741 B1 * | 12/2018 | ............ | B60W 30/12 |
| WO | WO-2017125209 A1 * | 7/2017 | ............ | B60W 30/12 |

\* cited by examiner

METHOD FOR OPERATING A SENSOR OF A MOTOR VEHICLE

CROSS REFERENCE

The present application claims the benefit under 35 U.S.C. § 119 of German Patent Application No. DE 102019220223.3 filed on Dec. 19, 2019, which is expressly incorporated herein by reference in its entirety.

FIELD

The present invention relates to a method for operating a sensor of a motor vehicle. The present invention further relates to a device, to a sensor system, to a motor vehicle, to a computer program and to a machine-readable memory medium.

BACKGROUND INFORMATION

Radar systems for measuring distance, relative velocity and angles of objects (such as, for example, from vehicles and obstacles) are increasingly used in motor vehicles for safety and convenience functions. The use of radar including a synthetic aperture in the automotive sector has been studied for several years. The principle of the synthetic aperture allows for particularly exact angle measurements during the ego movement of the radar sensor by using the radar measurements at different local positions as a synthetic antenna aperture (antenna surface). The synthetic aperture is achieved in that at the point in time of each radar measurement the transceiver antennas are at different local positions due to the ego movement of the radar and may thus be computationally processed as if a large antenna aperture were present along the driving trajectory. Thus, separating capabilities between closely adjacent targets in the angle measurement, which would be unattainable using a real antenna aperture, are possible using a single transceiver. This is due, in particular, to the fact that a large synthetic aperture is achievable due to the ego movement of the radar, which would be impractical or impossible with a real antenna aperture due to the large number of necessary antenna elements.

German Patent Application No. DE 10 2017 128 194 A1 describes a self-location of a vehicle using an automobile radar including a synthetic aperture.

German Patent Application No. DE 10 2017 129 933 A1 describes a method for detecting pieces of surroundings information with the aid of a radar system including a synthetic aperture.

SUMMARY

An object of the present invention includes providing a concept for efficiently operating, or for the operation of, a sensor of a motor vehicle.

This object may be achieved in accordance with example embodiments of the present invention. Advantageous embodiments of the present invention are described herein.

According to one first aspect of the present invention, a method for operating a sensor of a motor vehicle is provided. In accordance with an example embodiment of the present invention, the method includes the following steps:
ascertaining an ego trajectory of the sensor,
generating adaptation signals for adapting at least one operating parameter of the sensor based on the ascertained ego trajectory and
outputting the adaptation signals in order to adapt the at least one operating parameter of the sensor based on the adaptation signals.

According to one second aspect of the present invention, a device is provided, which is configured to carry out all steps of the example method according to the first aspect of the present invention.

According to a third aspect of the present invention, a sensor system is provided, including a sensor and the device according to the second aspect of the present invention.

According to a fourth aspect of the present invention, a motor vehicle is provided, including the device according to the second aspect or the sensor system according to the third aspect of the present invention.

According to a fifth aspect of the present invention, a computer program is provided, which includes commands which, when the computer program is executed by a computer, for example, by the device according to the second aspect of the present invention, prompt the computer to carry out a method according to the first aspect of the present invention.

According to a sixth aspect of the present invention, a machine-readable memory medium is provided, on which the computer program according to the fifth aspect of the present invention is stored.

In accordance with the present invention, the above object may be achieved by ascertaining an ego trajectory of the sensor, the sensor being operating based on the ascertained ego trajectory. This, in particular, in that at least one operating parameter of the sensor is adapted based on the ascertained ego trajectory. For this purpose, adaptation signals for adapting at least one operating parameter are generated and output based on the ascertained ego trajectory.

This may yield, in particular, the technical advantage that the sensor of the motor vehicle may be efficiently operated depending on the ego trajectory. In this way, it is possible, for example, to minimize necessary computing operations, which are carried out or have been carried out, for example, within the scope of an evaluation of a measurement.

This may further yield the technical advantage, for example, that the sensor signals of the sensor may be processed, for example, in real time. This is particularly advantageous, in particular, if a measurement of the sensor is used in order, based on the measurement, to operate a driver assistance system of the motor vehicle.

According to one specific embodiment of the present invention, the adaptation signals include control signals for controlling the sensor. The adaptation thus includes, in particular, a control of the sensor. This may yield, for example, the technical advantage that the sensor may be efficiently operated or controlled. The control includes, for example, an adjustment of one or of multiple operating parameters and/or of one or multiple of the measurement characteristic variables of the sensor.

According to one specific embodiment of the present invention, the sensor of the motor vehicle is a radar sensor. The radar sensor is, for example, a SAR radar sensor.

The abbreviation "SAR" stands for "Synthetic Aperture Radar," which may be translated as "virtual aperture." The translation "synthetic aperture" is also common.

This means, therefore, in particular, that a SAR radar sensor is a radar sensor including a virtual aperture or a synthetic aperture. A synthetic aperture results from the fact that the sensor moves during the measurement. In the process, a frequency change of the frequency of an echo of a target at which the ascertained signal is reflected occurs as a result of the Doppler effect. This frequency change may be converted into a target angle. Sensors or radar sensors, in which a piece of information about the target angle is obtained from the Doppler measurement, are referred to below as SAR sensors or SAR radar sensors.

According to one specific embodiment of the present invention, it is provided that the ascertainment of an ego trajectory includes an estimation of an ego trajectory of the sensor. This means, therefore, in particular, that it is possible to estimate the ego trajectory. The ascertained ego trajectory in this case is, in particular, an estimated ego trajectory.

This may yield, for example, the technical advantage that the ego trajectory may be efficiently ascertained.

According to one specific embodiment of the present invention, it is provided, that sensor signals are received from at least one further sensor of the motor vehicle and/or of the sensor, the ego trajectory being ascertained based on the sensor signals, the at least one further sensor being a sensor selected from the following group of sensors: inertial sensor, in particular, uniaxial or multiaxial acceleration sensor or uniaxial or multiaxial rotation sensor, magnetometer sensor, satellite navigation sensor (GNSS), in particular, GPS sensor, GLONASS or Galileo sensor, odometry sensor, surroundings sensor, in particular, radar sensor, video sensor, LIDAR sensor, ultrasonic sensor, infrared sensor.

This may yield, in particular, the technical advantage that the ego trajectory may be efficiently ascertained.

This means, therefore, in particular, that not only satellite navigation sensors may be used to estimate the ego trajectory, for example. Rather, it may in particular be provided, in addition to or instead of according to one specific embodiment of the present invention that, for example, past surroundings sensor data of a surroundings sensor may be used in order to estimate the ego trajectory. Thus, for example, a movement relative to objects classified as a stationary target may be ascertained based on surroundings sensor data of the surroundings sensor, so that it is possible based on this ascertained movement to ascertain or estimate the ego trajectory.

Thus, for example, it is possible to use radar data of a radar sensor for this ascertainment of the corresponding movement.

LIDAR sensor data, video data, ultrasonic sensor data and/or infrared sensor data may, for example, also be used in addition to or instead of radar data in order to ascertain this movement.

This exploits, in particular, the fact that the motor vehicle exhibits an inertia so that based on this inertia, it is possible to efficiently utilize the surroundings sensor data in order to ascertain the ego trajectory.

In one specific embodiment of the present invention, it is provided, in particular, that sensor signals of the sensor may also be used in order to ascertain the ego trajectory.

If, therefore, the sensor of the motor vehicle is a radar sensor, the corresponding radar sensor data may be used according to one specific embodiment in order to ascertain the ego trajectory of the radar sensor.

According to one specific embodiment of the present invention, it is provided that the at least one operating parameter is in each case an element selected from the following group of parameters: evaluation algorithm parameter, which specifies an evaluation algorithm for evaluating a measurement of the sensor, aperture parameter, which specifies a length of an aperture, in particular, of a virtual aperture, of the sensor, image size parameter, which specifies an image size of a sensor image of the sensor, resolution parameter, which specifies a resolution and/or pixel size of a sensor image of the sensor, measurement characteristic variable parameter, which specifies at least one measurement characteristic variable of a measurement to be carried out with the aid of the sensor.

This may yield, for example, the technical advantage that particularly suitable operating parameters may be efficiently adapted in order to efficiently operate the one sensor.

An evaluation algorithm according to one specific embodiment of the present invention includes an imaging algorithm. A sensor image based on the sensor signals of the sensor is ascertained, for example, with the aid of the imaging algorithm.

If the sensor is a video sensor, an image or a sensor image is a video image.

If, for example, the sensor is a radar sensor, an image or a sensor image is a radar image.

If, for example, the sensor is a LIDAR sensor, an image or a sensor image is a LIDAR image or a LIDAR point cloud.

If, for example, the sensor is an ultrasonic sensor, an image or sensor image is an ultrasonic sensor image.

If, for example, the sensor is an infrared sensor, an image or a sensor image is an infrared sensor image.

The wordings "virtual aperture" and "synthetic aperture" may be used synonymously.

According to one specific embodiment of the present invention, it is provided that the sensor is a propagation time measuring sensor, in particular, a radar sensor, in particular, a SAR radar sensor, the at least one measurement characteristic variable in each case being an element selected from the following group of measurement characteristic variables: inter-pulse distance, pulse shape parameter (for example, slope of an FMCW ramp, bandwidth of the pulse, sample rate for generating and scanning the pulse, pulse duration). In general, a pulse means, in particular, a radar wave shape suitable for a range Doppler evaluation, for example, a linear FMCW ramp, an OFDM symbol or a coded signal.

This may yield, for example, the technical advantage that the sensor may be efficiently operated. This may further yield, for example, the technical advantage that a measurement that is carried out with the aid of the sensor may be efficiently carried out.

According to one specific embodiment of the present invention, it is provided that at least one instantaneous dynamic characteristic variable, in particular, ego velocity and/or ego acceleration, of the sensor is ascertained, the adaptation signals being generated based on the at least one instantaneous dynamic characteristic variable.

This may yield, for example, the technical advantage that the adaptation signals may be efficiently generated.

According to one specific embodiment of the present invention, it is provided that the method according to the first aspect is executed or carried out with the aid of the device according to the second aspect.

Technical functionalities of the method according to the first aspect result similarly from corresponding technical functionalities of the device according to the second aspect and vice versa. This means, therefore, in particular, that method features result from corresponding device features and vice versa.

According to one specific embodiment of the present invention, it is provided that the method according to the first aspect is a computer-implemented method.

According to one specific embodiment of the present invention, it is provided that the propagation time measuring sensor includes a transmitting antenna and a receiving antenna.

According to one specific embodiment of the present invention, it is provided that the propagation time measuring sensor includes a combined transceiver antenna.

According to one specific embodiment of the present invention, it is provided that the propagation time measuring sensor includes an analogous front-end for generating a wave shape and for conditioning a received signal.

According to one specific embodiment of the present invention, it is provided that the propagation time measuring sensor includes an analog/digital converter, which is configured to scan the received signal of the propagation time measuring sensor.

According to one specific embodiment of the present invention, a digital processing unit is provided, which is configured to process digital signals (i.e., the sensor signals), which represent a measurement carried out with the aid of the sensor.

According to one specific embodiment of the present invention, the digital processing unit is included in the sensor.

According to one specific embodiment of the present invention, it is provided that the digital processing unit is included in the device according to the second aspect.

According to one specific embodiment of the present invention, it is provided that the digital processing unit is included in the sensor system according to the third aspect or in the motor vehicle according to the fourth aspect.

According to one specific embodiment of the present invention, multiple digital processing units are provided, so that both the device and/or the sensor system and/or the motor vehicle may each include a separate digital processing unit.

In one specific embodiment of the present invention, a non-linearity of the ascertained ego trajectory is ascertained, the adaptation signals being generated based on the ascertained non-linearity.

The ascertainment of the non-linearity includes, for example, an ascertainment of a second derivation according to the location and/or according to the time of the ascertained ego trajectory.

According to one specific embodiment of the present invention, a deviation of the ascertained non-linearity from a linearity is ascertained, the adaptation signals being generated based on the ascertained deviation.

In one specific embodiment of the present invention, it is provided that the sensor is a sensor including a synthetic aperture, in particular, a radar sensor including a synthetic aperture (SAR sensor).

In one specific embodiment of the present invention, the method includes a restriction of the ascertained ego trajectory to a trajectory that includes the position of the sensor during one measuring cycle of the sensor, for example, in a ramp sequence, at multiple, at least, however, three different, points in time.

These points in time may, but do not necessarily have to coincide with the emission of the pulses, for example, radar pulses. The adaptation signals are then generated, in particular, based on the restricted ego trajectory.

The wording "at least one" stands for "one or multiple."

BRIEF DESCRIPTION OF THE DRAWINGS

Exemplary embodiments of the present invention are depicted in the figures and described in greater detail in the description below.

DETAILED DESCRIPTION OF EXAMPLE EMBODIMENTS

Figure 1:
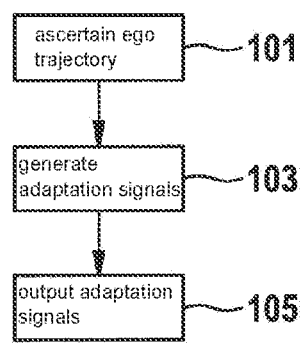
FIG. 1 shows a flowchart of a method for operating a sensor of a motor vehicle, in accordance with an example embodiment of the present invention.

Identical reference numerals may be used for identical features below.

FIG. 1 shows a flowchart of an example method for operating a sensor of a motor vehicle, including the following steps:

ascertaining 101 an ego trajectory of the sensor, generating 103 adaptation signals for adapting at least one operating parameter of the sensor based on the ascertained ego trajectory and outputting 105 the adaptation signals in order to adapt the at least one operating parameter of the sensor based on the adaptation signals.

According to one specific embodiment, it is provided that the method according to the first aspect includes an adaptation of the at least one operating parameter of the sensor based on the output adaptation signals.

Figure 2:
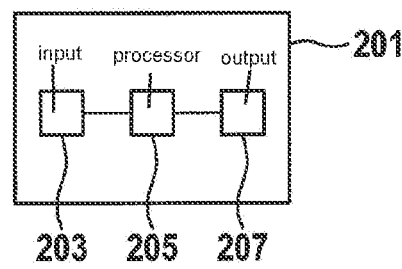
FIG. 2 shows a device, in accordance with an example embodiment of the present invention.

FIG. 2 shows a device 201.

Device 201 is configured to carry out all steps of the method according to the first aspect.

Device 201 includes an input 203, which is configured to receive the sensor signals from at least one further sensor of the motor vehicle and/or of the sensor.

Device 201 further includes a processor 205, which is configured to carry out or execute the step of ascertaining an ego trajectory of the sensor and the step of generating adaptation signals.

Processor 205 is configured, for example, to ascertain the ego trajectory of the sensor based on the sensor signals. Processor 205 is configured, for example, to ascertain at least one instantaneous dynamic characteristic variable based on the sensor signals.

Processor 205 is configured, for example, to ascertain at least one instantaneous dynamic characteristic variable of the sensor, the adaptation signals being generated based on the at least one instantaneous dynamic characteristic variable.

Device 201 further includes an output 207, which is configured to output the adaptation signals in order to adapt the at least one operating parameter of the sensor based on the adaptation signals.

Processor 205 is a digital processing unit, for example.

Figure 3:
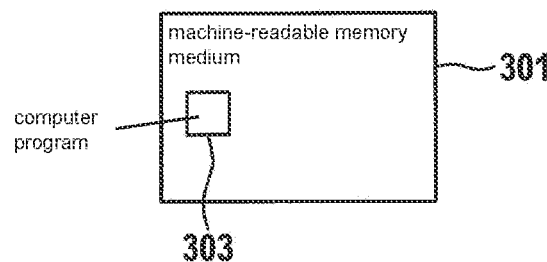
FIG. 3 shows a machine-readable memory medium, in accordance with an example embodiment of the present invention.

FIG. 3 shows a machine-readable memory medium 301.

Computer program 303 is stored on machine-readable memory medium 301. Computer program 303 includes commands which, when computer program 303 is executed by a computer, prompt the computer to carry out a method according to the first aspect.

Figure 4:
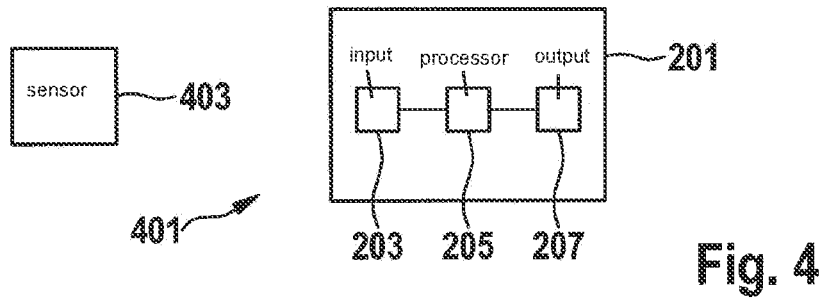
FIG. 4 shows a sensor system, in accordance with an example embodiment of the present invention.

FIG. 4 shows a sensor system 401.

Sensor system 401 includes a sensor 403 and device 201 according to FIG. 2.

Device 201 according to one specific embodiment may be integrated into sensor 403.

According to one specific embodiment, it is provided that device 201 is not integrated into sensor 403, i.e., is designed separately from the latter.

Sensor 403 is, for example, a radar sensor, in particular, a SAR radar sensor.

Figure 5:
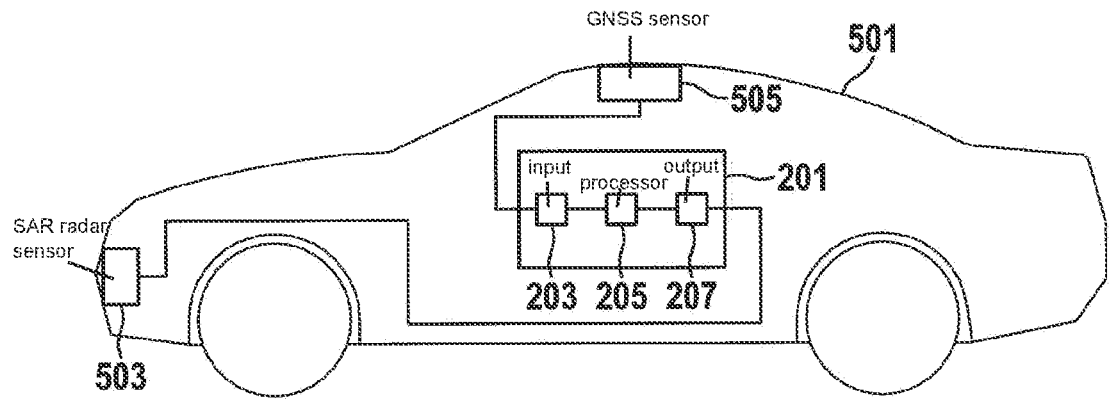
FIG. 5 shows a motor vehicle, in accordance with an example embodiment of the present invention.

FIG. 5 shows a motor vehicle 501.

Motor vehicle 501 includes device 201 according to FIG. 2.

Motor vehicle 501 includes a SAR radar sensor 503.

Motor vehicle 501 further includes a GNSS sensor 505.

The GNSS signals, i.e., the position signals, of GNSS sensor 505 are provided to input 203 of device 201.

Adaptation signals are accordingly output to SAR radar sensor 503 with the aid of output 207.

This means, therefore, that SAR radar sensor 503 is operated based on the output adaptation signals. This, in particular, by adapting one or multiple operating parameters of SAR sensor 503. This, based on the output adaptation signals.

In one specific embodiment not shown, it is provided that the motor vehicle includes one or multiple additional sensors instead of or in addition to GNSS sensor 505.

Figure 6:
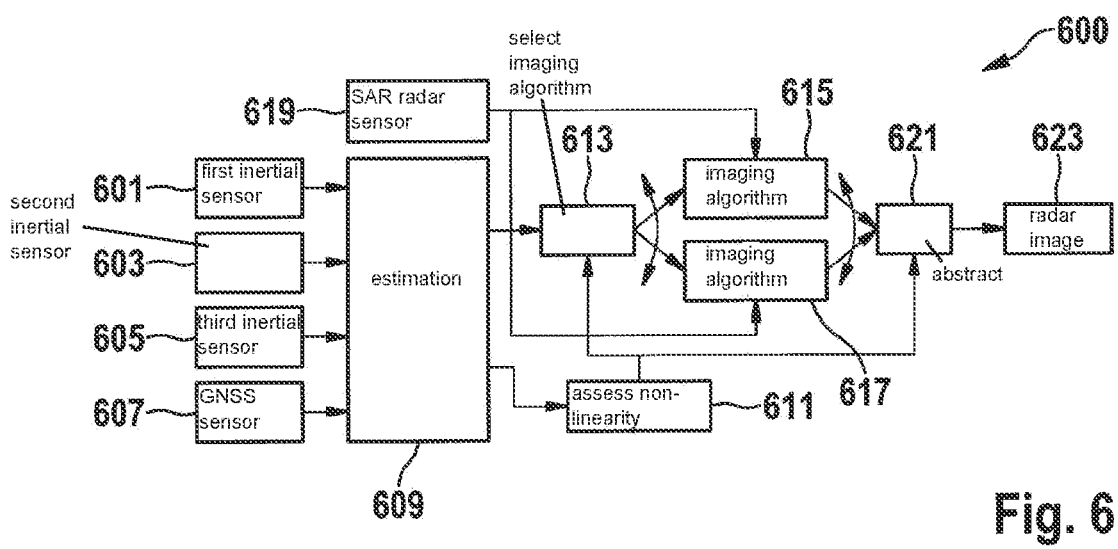
FIG. 6 shows a first block diagram, in accordance with an example embodiment of the present invention.

FIG. 6 shows a first block diagram 600, which elucidates by way of example the concept described herein for operating a sensor of a motor vehicle.

According to first block diagram 600, a first inertial sensor 601, a second inertial sensor 603, a third inertial sensor 605, and a GNSS sensor 607 are provided.

The respective sensor signals of these four sensors 601, 603, 605, 607 are used in order to estimate an ego trajectory of a SAR radar sensor 619 based on these sensor signals. This estimation is carried out according to a function block 609.

The estimated ego trajectory is provided to a function block 611, according to which the non-linearity of the estimated ego trajectory is assessed. This assessment includes, for example, a determination or ascertainment of a second derivation of the ego trajectory.

As a function of the assessed non-linearity, in particular, as a function of the second derivation, it is provided that a decision is made between a first imaging algorithm 615 and a second imaging algorithm 617 in order to generate radar images based on the radar signals of SAR radar sensor 619.

For this purpose, it is provided that the assessed non-linearity or the determined second derivation according to the location and/or according to the time, i.e., the result, is provided to a function block 613, according to which a decision is made between the two imaging algorithms 615, 617.

Furthermore, the estimated ego trajectory is also provided to function block 613, so that in addition to the assessed non-linearity or the determined derivation, the ego trajectory itself is used in order to decide which of the at least two implemented imaging algorithms is to be used.

An, in particular, optional function block 621 is also provided, which is used, for example, to abstract outwardly the potentially different data formats of the results of the two imaging algorithms 615, 617 in order to offer a uniform interface regardless of the algorithm used.

The radar signals are evaluated with the aid of the selected imaging algorithm in order to generate a radar image 623.

Figure 7:
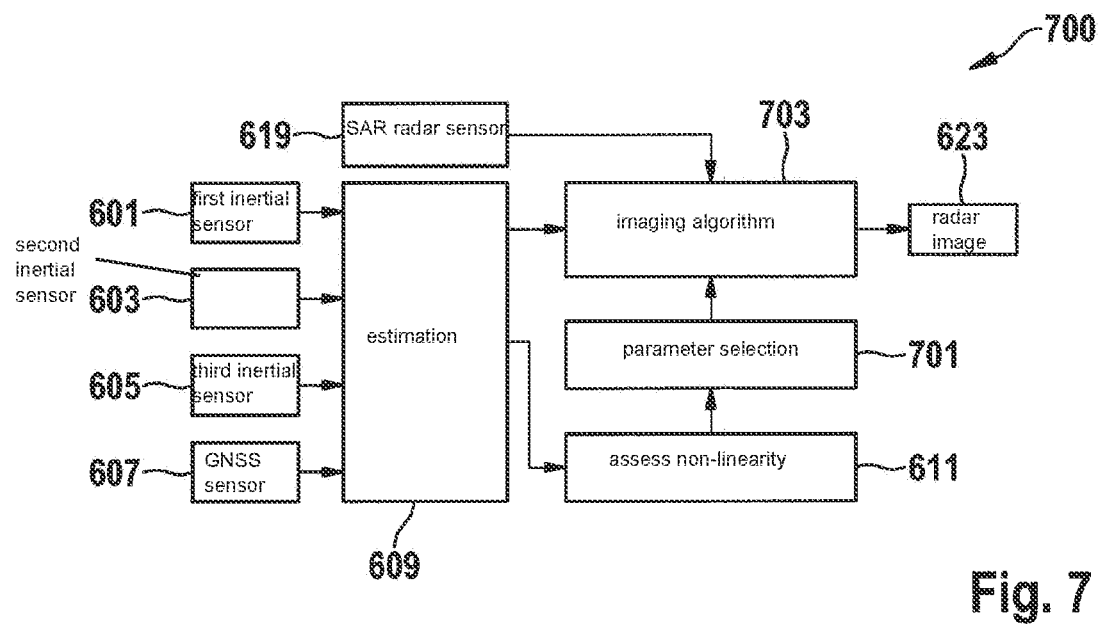
FIG. 7 shows a second block diagram, in accordance with an example embodiment of the present invention.

FIG. 7 shows a second block diagram 700, which elucidates by way of example the concept described herein for operating a sensor of a motor vehicle.

In this case, it is provided as a contrast to first block diagram 600 that, for example, an aperture parameter and/or image size parameter and/or resolution parameter of SAR radar sensor 619 is/are adapted based on the assessed non-linearity of the ego trajectory or of the determined second derivation.

This is via a corresponding selection of suitable parameters, which is carried out according to a function block 701.

These parameters are used as input variables for an imaging algorithm 703.

Radar image 623 is ascertained with the aid of imaging algorithm 703 based on these parameters and on the radar signals of SAR radar sensor 619.

Figure 8:
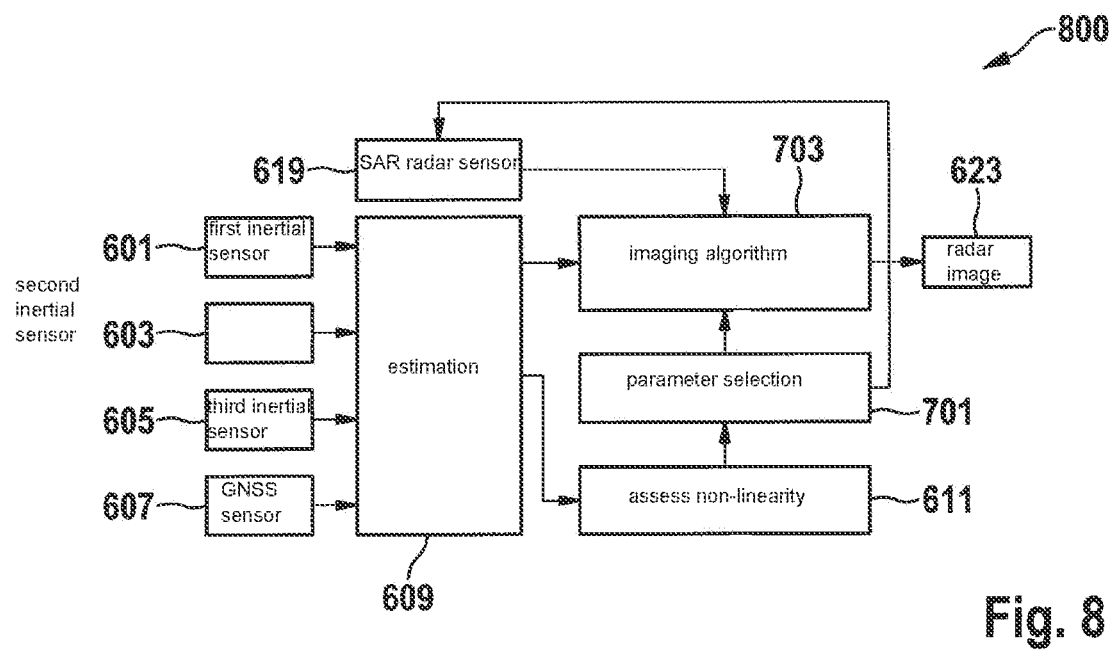
FIG. 8 shows a third block diagram, in accordance with an example embodiment of the present invention.

FIG. 8 shows a third block diagram 800, which elucidates by way of example the concept described herein for operating a sensor of a motor vehicle.

As a contrast to second block diagram 700 according to FIG. 7, it is provided in the case of third block diagram 800 according to FIG. 8, that there, at least one measurement characteristic variable of SAR radar sensor 619 is ascertained based on the adaptation criterion according to block diagram 611.

For example, an inter-pulse distance and/or a pulse shape parameter (for example, slope of an FMCW ramp, bandwidth of the pulse, sample rate for generating and scanning the pulse, pulse duration) is adapted and/or adjusted based on the estimated ego trajectory. In general, a pulse means, in particular, a radar wave shape suitable for a range Doppler evaluation, for example, a linear FMCW ramp, an OFDM symbol or a coded signal.

In summary, the present invention disclosed herein is based on providing a novel, adaptive activation and evaluation of a sensor, in particular, a SAR radar sensor, for automotive applications. The method is usable, in particular, regardless of modulation for radar systems including a synthetic aperture (for example, fast-chirp radar, pulse compression radar, OFDM radar). In these systems, an ego movement of the sensor, in particular, of the radar sensor is advantageously determined during a measuring cycle and taken into account for an adaptive adaptation of the SAR evaluation and/or of the modulation parameters.

The radar sensor preferably allows for a measurement using arbitrary trajectories, a computing-efficient SAR evaluation being allowed and/or provided by a selection of a maximally suitable SAR imaging algorithm and/or of its configuration.

The present invention, in one advantageous implementation, enables an adaptation of the radar parameters on the transmitter side for optimally utilizing the available computing resources and the provided ego trajectory.

A main features of the present invention is thus based, in particular, on carrying out an estimation of the ego trajectory of a sensor of a motor vehicle, in particular, of a SAR radar sensor, parameters of the radar image and/or the radar modulation parameters being adaptively adapted based on the estimated ego trajectory of the SAR imaging algorithm.

The SAR imaging algorithm and the radar modulation parameters are, in particular, subsumed under the general wording "operating parameters of the sensor."

The technical advantage of such an adaptive adaptation is, in particular, that depending on the ego trajectory, the most efficient (SAR) imaging algorithm may be used, which is applicable for the driven ego trajectory.

In this way, it is possible to minimize the necessary computing operations for the calculation and/or the ascertainment of the sensor image, in particular, of the SAR radar image. Further radar parameters, in particular, SAR parameters, may also be adaptively selected depending on the ego trajectory such as, for example, a length of a synthetic aperture, an image size and/or pixel size, this as a function, in particular, of an expected resolution.

An optimal choice and parameterization of the imaging algorithm saves computing operations depending on the ego trajectory, and thus a power loss and a latency may be minimized while the quality of the output image remains sufficiently high.

The adapted choice of the most suitable imaging algorithm, in particular, of the most suitable SAR imaging algorithm further advantageously permits an optimal adaptation of the algorithms to the setting and/or to the surroundings of the motor vehicle, which may be more exactly detected as a result than in a non-adaptive approach. In this case, a flexibility with respect to the driven ego trajectory is, in principle, advantageously maintained.

A length of the synthetic aperture may advantageously also be adapted as a function of the ego trajectory and of the available computing resources as well as of the SAR imaging algorithm to be used.

This adaptation may in turn advantageously serve the purpose of meeting the requirements of a computing-efficient algorithm. As a result, the available computing resources may be utilized consistently and optimally for each ego trajectory.

In one specific embodiment, it is provided that to estimate the ego trajectory, the sensor signals of the corresponding sensors, i.e., the sensor measured data and/or sensor signals, are processed using a model-based state estimator.

On the basis of an established criterion, which is evaluated based on the estimated ego trajectory, the algorithm makes at least one decision, which adaptively influences the further measurement and/or processing. This decision may affect one or multiple of the following functional units:
choice of the SAR imaging algorithm
change of the parameters of the SAR imaging algorithm, for example,
length of the virtual aperture
SAR image size
resolution and/or pixel size of the SAR image
change of the wave shape parameter of the transmit signal, for example,
inter-pulse and/or inter-ramp distance
slope of the FMCW ramps This criterion may, for example, be that the non-linearity of the ego-trajectory is assessed. For this purpose, the second deviation may be determined according to the location and/or according to the time of the ego trajectory. The aforementioned decisions are adaptively made as a function of their values. In the process, a decision is made in each case between two or multiple alternatives (not depicted).

If the adaptivity relates to the imaging algorithm (see FIG. 6), then a distinction may be made between two algorithms, which take a non-linear trajectory into account, and those that assume a linear ego trajectory and as a result have a lower computing complexity.

If the adaptivity relates to a parameter (see FIG. 7), for example, the length of the virtual aperture, then the latter may be selected to be longer, the less the trajectory deviates from a linear trajectory in the event the algorithm assumes a linear trajectory without an error degree being exceeded. If, however, an algorithm must be used that is also able to process non-linear trajectories and has greater computing complexity as a result, then the image size and/or the resolution and/or pixel size of the SAR image may be reduced in order not to exceed a limited computing capacity (present digital hardware). In this way, the real time capability may be ensured under these conditions as well.

If the adaptivity relates to the wave shape (see FIG. 8), then the linearity of the spatial scanning locations may be achieved in that the pulse repetition duration is selected as a function of the instantaneous velocity. In this way, it is possible to compensate for different velocities or present accelerations. The slope of the ramp may also be adapted depending on the ego velocity. This in turn enables the use of a rapid algorithm.

The approaches shown in FIGS. 6 through 8 may also be combined with one another in a suitable manner. The ego trajectory may take place based on the measured signals of one or of multiple inertial sensors. In addition, a determination of and/or increase in the accuracy of the ego trajectory may take place based on the SAR measured data.

What is claimed is:

1. A method for operating a sensor of a motor vehicle, the method comprising:
ascertaining an ego trajectory of the sensor;
generating adaptation signals for adapting at least one operating parameter of the sensor based on the ascertained ego trajectory; and
outputting the adaptation signals to adapt the at least one operating parameter of the sensor based on the adaptation signals;
wherein the ego trajectory is provided to perform an assessment of a non-linearity of the estimated ego trajectory, wherein the assessment includes ascertaining a second derivation of the ego trajectory,
wherein as a function of the assessment of the non-linearity as a function of the second derivation, an imaging algorithm is used to generate radar images based on radar signals of a radar sensor,
wherein following the assessment of the non-linearity, parameters are selected for the image algorithm, in which an aperture parameter and/or an image size parameter and/or a resolution parameter of the radar sensor is adapted based on the assessment of the non-linearity of the ego trajectory or of the determined second derivation, and
wherein the radar image is ascertained with the imaging algorithm based on the selected parameters and on the radar signals of the radar sensor.

2. The method as recited in claim 1, further comprising:
receiving sensor signals from at least one further sensor of the motor vehicle and/or of the sensor, the ego trajectory being ascertained based on the sensor signals, the at least one further sensor being an element selected from at least one of the following sensors: an inertial sensor, a uniaxial or multiaxial acceleration sensor, or a uniaxial or multiaxial rotation sensor, or a magnetometer sensor, or a satellite navigation sensor, or a GPS sensor, or a GLONASS sensor, or a Galileo sensor, or an odometry sensor, or a surroundings sensor, or a radar sensor, or a video sensor, or a LIDAR sensor, or an ultrasonic sensor, or an infrared sensor.

3. The method as recited in claim 1, wherein the at least one operating parameter is, in each case, an element selected from at least one of the following parameters: an evaluation algorithm parameter which specifies an evaluation algorithm for evaluating a measurement of the sensor, an aperture parameter which specifies a length of a virtual aperture of the sensor, an image size parameter which specifies an image size of a sensor image of the sensor, an resolution parameter which specifies a resolution and/or a pixel size of a sensor image of the sensor, and/or a measurement characteristic variable parameter which specifies at least one measurement characteristic variable of a measurement to be carried out using the sensor.

4. The method as recited in claim 3, wherein the sensor includes a propagation time measurement sensor, the at least one measurement characteristic variable in each case being an element selected from at least one of the following measurement characteristic variables: an inter-pulse distance, a pulse shape parameter, a bandwidth of a pulse, a sample rate for generating and scanning the pulse, and/or a pulse duration.

5. The method as recited in claim 4, wherein the sensor includes a SAR radar sensor.

6. The method as recited in claim 1, further comprising:
ascertaining at least one instantaneous dynamic characteristic variable of the sensor, the adaptation signals being generated based on the at least one instantaneous dynamic characteristic variable.

7. The method as recited in claim 6, wherein the at least one instantaneous dynamic variable of the sensor includes an ego velocity of the sensor and/or an ego acceleration of the sensor.

8. The method as recited in claim 1, wherein the ascertained ego trajectory is restricted to a trajectory, which includes the position of the sensor during a measuring cycle of the sensor, in a ramp sequence, at at least three different points in time.

9. The method as recited in claim 1, wherein the sensor includes a synthetic aperture sensor (SAR sensor).

10. An apparatus to operate a sensor of a motor vehicle, comprising:
a device configured to perform the following:
ascertaining an ego trajectory of the sensor;
generating adaptation signals for adapting at least one operating parameter of the sensor based on the ascertained ego trajectory; and
outputting the adaptation signals to adapt the at least one operating parameter of the sensor based on the adaptation signals;
wherein the ego trajectory is provided to perform an assessment of a non-linearity of the estimated ego trajectory, wherein the assessment includes ascertaining a second derivation of the ego trajectory,
wherein as a function of the assessment of the non-linearity as a function of the second derivation, an imaging algorithm is used to generate radar images based on radar signals of a radar sensor,
wherein following the assessment of the non-linearity, parameters are selected for the image algorithm, in which an aperture parameter and/or an image size parameter and/or a resolution parameter of the radar sensor is adapted based on the assessment of the non-linearity of the ego trajectory or of the determined second derivation, and
wherein the radar image is ascertained with the imaging algorithm based on the selected parameters and on the radar signals of the radar sensor.

11. A sensor system, comprising:
a sensor; and
a device to operate the sensor, the device configured to perform the following:
ascertaining an ego trajectory of the sensor;
generating adaptation signals for adapting at least one operating parameter of the sensor based on the ascertained ego trajectory; and
outputting the adaptation signals to adapt the at least one operating parameter of the sensor based on the adaptation signals;
wherein the ego trajectory is provided to perform an assessment of a non-linearity of the estimated ego trajectory, wherein the assessment includes ascertaining a second derivation of the ego trajectory,
wherein as a function of the assessment of the non-linearity as a function of the second derivation, an imaging algorithm is used to generate radar images based on radar signals of a radar sensor,
wherein following the assessment of the non-linearity, parameters are selected for the image algorithm, in which an aperture parameter and/or an image size parameter and/or a resolution parameter of the radar sensor is adapted based on the assessment of the non-linearity of the ego trajectory or of the determined second derivation, and
wherein the radar image is ascertained with the imaging algorithm based on the selected parameters and on the radar signals of the radar sensor.

12. A motor vehicle, comprising:
a sensor system, including:
a sensor of the motor vehicle; and
a device to operate the sensor, the device configured to perform the following:
ascertaining an ego trajectory of the sensor;
generating adaptation signals for adapting at least one operating parameter of the sensor based on the ascertained ego trajectory; and
outputting the adaptation signals to adapt the at least one operating parameter of the sensor based on the adaptation signals;
wherein the ego trajectory is provided to perform an assessment of a non-linearity of the estimated ego trajectory, wherein the assessment includes ascertaining a second derivation of the ego trajectory,
wherein as a function of the assessment of the non-linearity as a function of the second derivation, an imaging algorithm is used to generate radar images based on radar signals of a radar sensor,
wherein following the assessment of the non-linearity, parameters are selected for the image algorithm, in which an aperture parameter and/or an image size parameter and/or a resolution parameter of the radar sensor is adapted based on the assessment of the non-linearity of the ego trajectory or of the determined second derivation, and
wherein the radar image is ascertained with the imaging algorithm based on the selected parameters and on the radar signals of the radar sensor.

13. A non-transitory machine-readable memory medium, on which is stored a computer program, which is executable by a processor, comprising:
a program code arrangement having program code for operating a sensor of a motor vehicle, by performing the following:
ascertaining an ego trajectory of the sensor;
generating adaptation signals for adapting at least one operating parameter of the sensor based on the ascertained ego trajectory; and outputting the adaptation signals to adapt the at least one operating parameter of the sensor based on the adaptation signals;

wherein the ego trajectory is provided to perform an assessment of a non-linearity of the estimated ego trajectory, wherein the assessment includes ascertaining a second derivation of the ego trajectory, wherein as a function of the assessment of the non-linearity as a function of the second derivation, an imaging algorithm is used to generate radar images based on radar signals of a radar sensor, wherein following the assessment of the non-linearity, parameters are selected for the image algorithm, in which an aperture parameter and/or an image size parameter and/or a resolution parameter of the radar sensor is adapted based on the assessment of the non-linearity of the ego trajectory or of the determined second derivation, and wherein the radar image is ascertained with the imaging algorithm based on the selected parameters and on the radar signals of the radar sensor.

* * * * *